United States Patent
Sasena et al.

(10) Patent No.: US 11,730,307 B2
(45) Date of Patent: Aug. 22, 2023

(54) REUSABLE BEVERAGE CARTRIDGE

(71) Applicant: Keurig Green Mountain, Inc., Burlington, MA (US)

(72) Inventors: Robert John Sasena, Acton, MA (US); Elaine Marie Duffy, Arlington, MA (US); Kin Chung Choi, Hong Kong (CN)

(73) Assignee: Keurig Green Mountain, Inc., Burlington, MA (US)

(*) Notice: Subject to any disclaimer, the term of this patent is extended or adjusted under 35 U.S.C. 154(b) by 704 days.

(21) Appl. No.: 16/671,230

(22) Filed: Nov. 1, 2019

(65) Prior Publication Data
US 2021/0127889 A1    May 6, 2021

(51) Int. Cl.
*A47J 31/06* (2006.01)

(52) U.S. Cl.
CPC ................... *A47J 31/0689* (2013.01)

(58) Field of Classification Search
CPC .. A47J 31/0689; A47J 31/0668; A47J 31/446; A47J 31/3623
USPC ..................... 99/295, 279 and, 275
See application file for complete search history.

(56) References Cited

U.S. PATENT DOCUMENTS

| | | | |
|---|---|---|---|
| 6,658,989 B2 | 12/2003 | Sweeney et al. | |
| 7,947,316 B2 | 5/2011 | Kirschner et al. | |
| 8,783,492 B2 | 7/2014 | Petitpas | |
| 9,232,871 B2 | 1/2016 | Rivera | |
| 9,521,923 B2 | 12/2016 | Priley | |
| 9,521,924 B2 | 12/2016 | Priley et al. | |
| 2011/0303095 A1* | 12/2011 | Fu | B01D 39/16 99/317 |
| 2012/0285330 A1* | 11/2012 | Demiglio | A47J 31/0689 99/279 |
| 2014/0272048 A1* | 9/2014 | Hristov | A47J 31/3628 426/433 |
| 2017/0190451 A1 | 7/2017 | van der Vliet et al. | |
| 2017/0251861 A1 | 9/2017 | DeMiglio | |
| 2020/0405091 A1* | 12/2020 | Obliger | A47J 31/3604 |

FOREIGN PATENT DOCUMENTS

| | | |
|---|---|---|
| CN | 104095543 A | 10/2014 |
| WO | WO 2016/075630 A1 | 5/2016 |
| WO | WO-2016075630 A1 * | 5/2016 |

OTHER PUBLICATIONS

International Search Report and Written Opinion dated Feb. 9, 2021 in connection with International Application No. PCT/US2020/057818.
PCT/US2020/057818, Feb. 9, 2021, International Search Report and Written Opinion.

* cited by examiner

*Primary Examiner* — Tu B Hoang
*Assistant Examiner* — Alba T Rosario-Aponte
(74) *Attorney, Agent, or Firm* — Pizarro Allen PC

(57) ABSTRACT

A reusable cartridge and method for forming a beverage using a beverage machine. The cartridge may include multiple openings, e.g., arranged to receive an inlet needle, through which liquid may be introduced into the cartridge. One or more of the openings may be closed to flow, e.g., by a plug that engages with a corresponding opening by a friction fit. A filter basket may be inserted or removed into the interior space through the opening and a cover may engage at top to seal the opening closed.

16 Claims, 7 Drawing Sheets

REUSABLE BEVERAGE CARTRIDGE

BACKGROUND

1. Field of Invention

This invention relates to beverage forming systems, such as coffee brewers that use a liquid to form a coffee beverage.

2. Related Art

Beverage forming systems that use a liquid, such as water, to form a beverage are well known. For example, U.S. Pat. No. 8,033,211 discloses a beverage forming system that uses a beverage cartridge containing a beverage material to make a beverage by introducing liquid into the cartridge.

SUMMARY OF INVENTION

Aspects of the invention relate to methods and apparatus for using a cartridge to make a beverage in a beverage forming machine. The cartridge may be reusable, e.g., may be loaded with beverage material, such as ground coffee, used to make a beverage, and then reloaded with fresh beverage material and used again to make another beverage. The cartridge may be usable with a beverage machine that employs inlet and/or outlet piercing elements, such as needles, that are intended to pierce a single-use cartridge to form inlet and outlet openings in the cartridge. Thus, the cartridge, though reusable, may not require that the beverage machine be reconfigured for use with the cartridge, e.g., by removing the piercing elements from the machine to accommodate the reusable cartridge.

In one aspect of the invention, a reusable beverage cartridge for use in a beverage forming machine includes a cartridge body having a bottom, a top, a sidewall extending between the bottom and the top, an interior space, and an outlet to allow beverage to exit the interior space. A cover is arranged to removably engage with the top of the cartridge body at the opening to close the opening of the body with the cover having a central opening to permit entry of liquid into the interior space and a plurality of peripheral openings through the cover positioned around the central opening. Each of the plurality of peripheral openings may be closed to flow in a reverse direction from the interior space to outside of the interior space and the central opening may be always open to flow in the reverse direction from the interior space.

In some embodiments, each of the plurality of peripheral openings includes a one-way valve that is openable in response to fluid pressure in a forward direction opposite the reverse direction, but otherwise prevents flow through a corresponding opening in a reverse direction. The one-way valves and the peripheral openings may be arranged so that a piercing element of the beverage machine may be received into the peripheral opening without contacting or otherwise interfering with the one-way valve. This may allow the piercing element to be used to introduce water into the cartridge through the peripheral opening while being protected from reverse flow from the cartridge, which may have beverage material that could clog the piercing element.

In some embodiments, the plurality of peripheral openings are selectively closed to flow such that each of the plurality of peripheral openings is openable to flow in the reverse direction from the interior space, and closeable to flow in the reverse direction from the interior space. This, for example, may allow a user to selectively open and/or close the peripheral openings depending on how the user wishes to use the cartridge, or allow the peripheral openings themselves to open and/or close depending on use conditions. For example, in some embodiments, each of the plurality of peripheral openings includes a manually operable door that is movable between open and closed positions, with the manually operable door closing a corresponding one of the plurality of peripheral openings to flow in the reverse direction when in the closed position. For example, the manually operable door may include a rotatable shutter that is mounted to the cover and is movable to simultaneously open and close the plurality of peripheral openings. In other arrangements, a door for each opening may be individually opened and/or closed, e.g., by user operation and/or based on fluid pressure.

In some embodiments, a plurality of plugs are provided where each of the plurality of plugs is engaged with a corresponding one of the plurality of peripheral openings in a closed position to prevent flow in the reverse direction, and is movable to an open position to allow flow in the reverse direction. For example, each plug may have a portion that is inserted into a corresponding opening to frictionally engage the opening, and the portion may be moved out of the opening to allow flow in the reverse direction. Plugs may be movable to the open position by moving the plug in a direction opposite to the reverse direction, e.g., by moving the plug into the interior space of the cartridge, and plugs may remain attached to the cover when disengaged from a respective one of the plurality of peripheral openings. In some cases, plugs may be arranged to remain disengaged from a respective peripheral opening once the plug is disengaged from the opening. Moreover, the plugs may be arranged to require the plug to be forced into the respective one of the plurality of peripheral openings to reengage with the respective one of the plurality of peripheral openings once disengaged.

In some cases, the plurality of plugs are attached together, e.g., so that the plugs are moveable together between open and closed positions, or so that plugs can be moved individually while remaining attached together. In some embodiments, the plurality of plugs are attached to the cover such that the plugs remain attached to the cover even when disengaged from a corresponding opening. For example, all of the plurality of plugs may remain attached with the cover even when all of the plurality of plugs are disengaged from a respective one of the plurality of peripheral openings.

In some embodiments, the cartridge includes a filter basket defining a beverage material space in which to hold a beverage material used to form a beverage. The filter basket may have a top opening through which the beverage material space is accessible, an inlet to receive liquid into the beverage material space, and a filter portion to allow flow of beverage out of the beverage material space. The filter basket may be received into the interior space of the cartridge body through the opening of the cartridge body.

In another aspect of the invention, a reusable beverage cartridge for use in a beverage forming machine includes a cartridge body having a bottom, a top, a sidewall extending between the bottom and the top, an interior space, and an outlet to allow beverage to exit the interior space. A cover is arranged to removably engage with the top of the cartridge body at the opening to close the opening of the body with the cover having a central opening to permit entry of liquid into the interior space and a plurality of peripheral openings positioned around the central opening to permit entry of liquid into the interior space. Each of the plurality of peripheral openings may be closed to flow by a plug that engages a corresponding peripheral opening. For example, a plug may have a portion that is inserted into a corresponding opening to engage with the opening, or may have a portion that surrounds a part of the opening to engage with the opening.

In some embodiments, each of the plugs is movable into the interior space to disengage from and open the corresponding peripheral opening to flow. For example, a tool or piercing element of a beverage machine may contact a plug to move the plug into the interior space and open the corresponding peripheral opening to flow. In some cases, each of the plugs is arranged to remain attached to the cover after disengagement from the corresponding peripheral opening. For example, the plugs may be attached together and individually or collectively moveable between open and closed positions to open and close a corresponding opening to flow. The cover may include a conduit arranged to distribute liquid introduced into the central opening, and the plugs may be attached to the conduit, e.g., so the plugs remain attached to the cover even when in the open position and disengaged from a corresponding opening.

In some embodiments, each of the plugs is movable to disengage from and open the corresponding peripheral opening to flow, and is arranged to remain disengaged from the corresponding peripheral opening once the plug is disengaged. Thus, each plug may be arranged to require the plug to be forced into engagement with the corresponding peripheral opening to reengage with the peripheral opening. Such forcing may be done by hand and/or by fluid pressure in the cartridge interior space.

These and other aspects of the invention will be apparent from the following description and claims.

BRIEF DESCRIPTION OF DRAWINGS

Aspects of the invention are described below with reference to the following drawings in which like numerals reference like elements, and wherein.

DETAILED DESCRIPTION

It should be understood that aspects of the invention are described herein with reference to certain illustrative embodiments and the figures. The illustrative embodiments described herein are not necessarily intended to show all aspects of the invention, but rather are used to describe a few illustrative embodiments. Thus, aspects of the invention are not intended to be construed narrowly in view of the illustrative embodiments. In addition, it should be understood that aspects of the invention may be used alone or in any suitable combination with other aspects of the invention.

In accordance with an aspect of the invention, a reusable cartridge may have a removable cover at a top of the cartridge body that can be removed to allow access to the interior space of the body. A filter basket may be received in the interior space, and be arranged to hold a beverage material so that liquid introduced into the body via inlet openings may mix with the beverage material to form a beverage. The beverage may pass through a filter portion of the filter basket and flow to the outlet opening for exit from the cartridge. The filter basket may be removable from the body, e.g., for cleaning or replacement. For example, different filter baskets may be used for different beverage operations. As one example, one filter basket may provide suitable backpressure and filter pore sizes suitable for making an espresso coffee, while another filter basket may be used for making a standard, American-style coffee. The cartridge may be arranged to cooperate with inlet and outlet needles of a beverage forming machine that extend into inlet and/or outlet openings, respectively, of the cartridge and thus may be used with a beverage forming machine that is also designed to operate with single-use cartridges that are pierced to form inlet and outlet openings. One or more of the inlet openings may be closed to flow, e.g., to prevent flow from inside the cartridge through an inlet opening. This arrangement may help prevent clogging of an inlet needle or other port, e.g., when the inlet needle is not used to introduce water into the cartridge. For example, some brewers may have two or more inlet needles or other ports that can be selectively used to introduce liquid into a cartridge. In some cases, one or more inlet ports are not used to introduce water, and beverage material such as coffee grounds may flow in a reverse direction into the port or otherwise exiting the cartridge. By closing one or more inlet openings to flow, such unwanted flow can be prevented.

Figure 1:
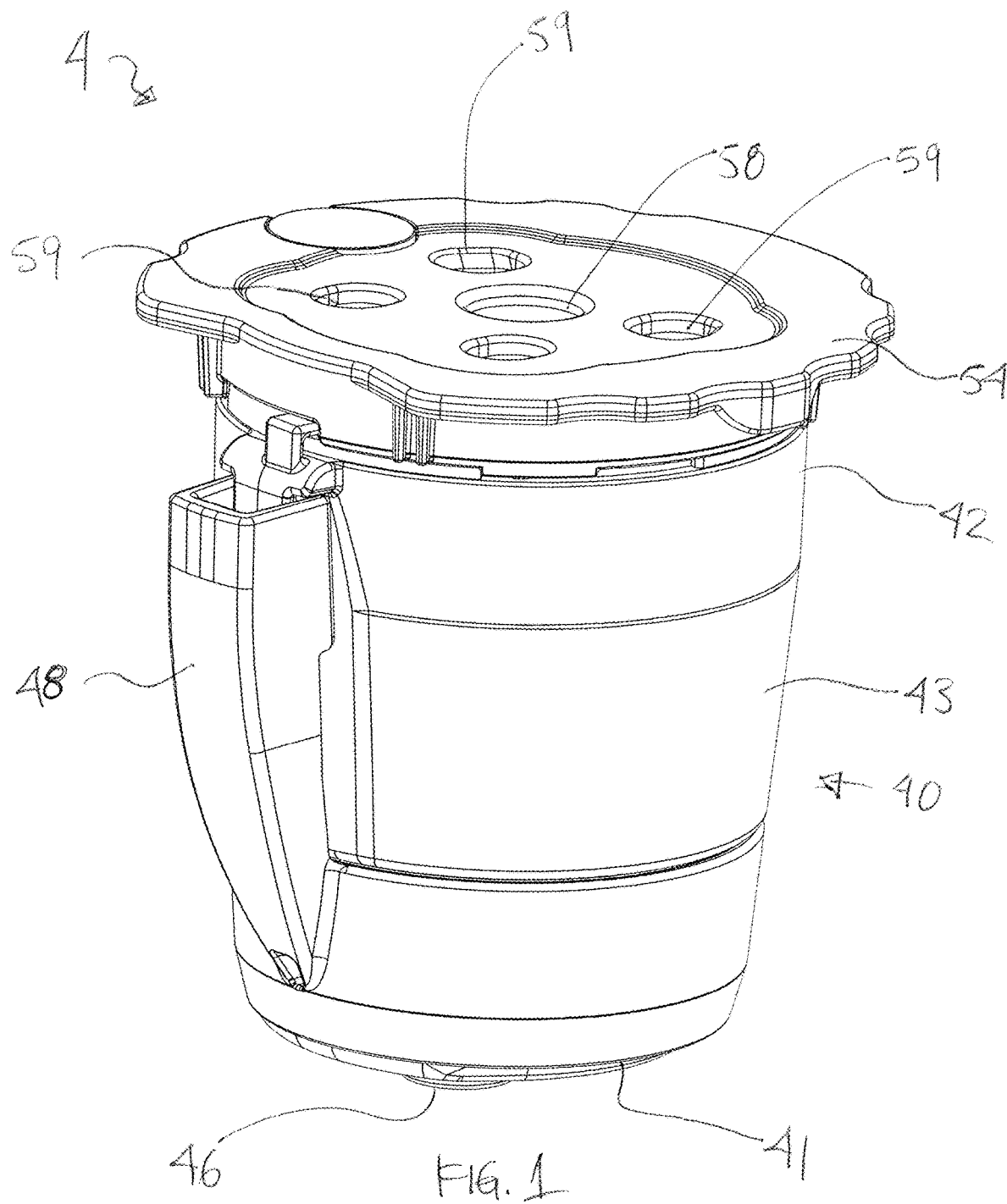
FIG. 1 is a perspective view of a beverage cartridge in an illustrative embodiment.
Figure 2:
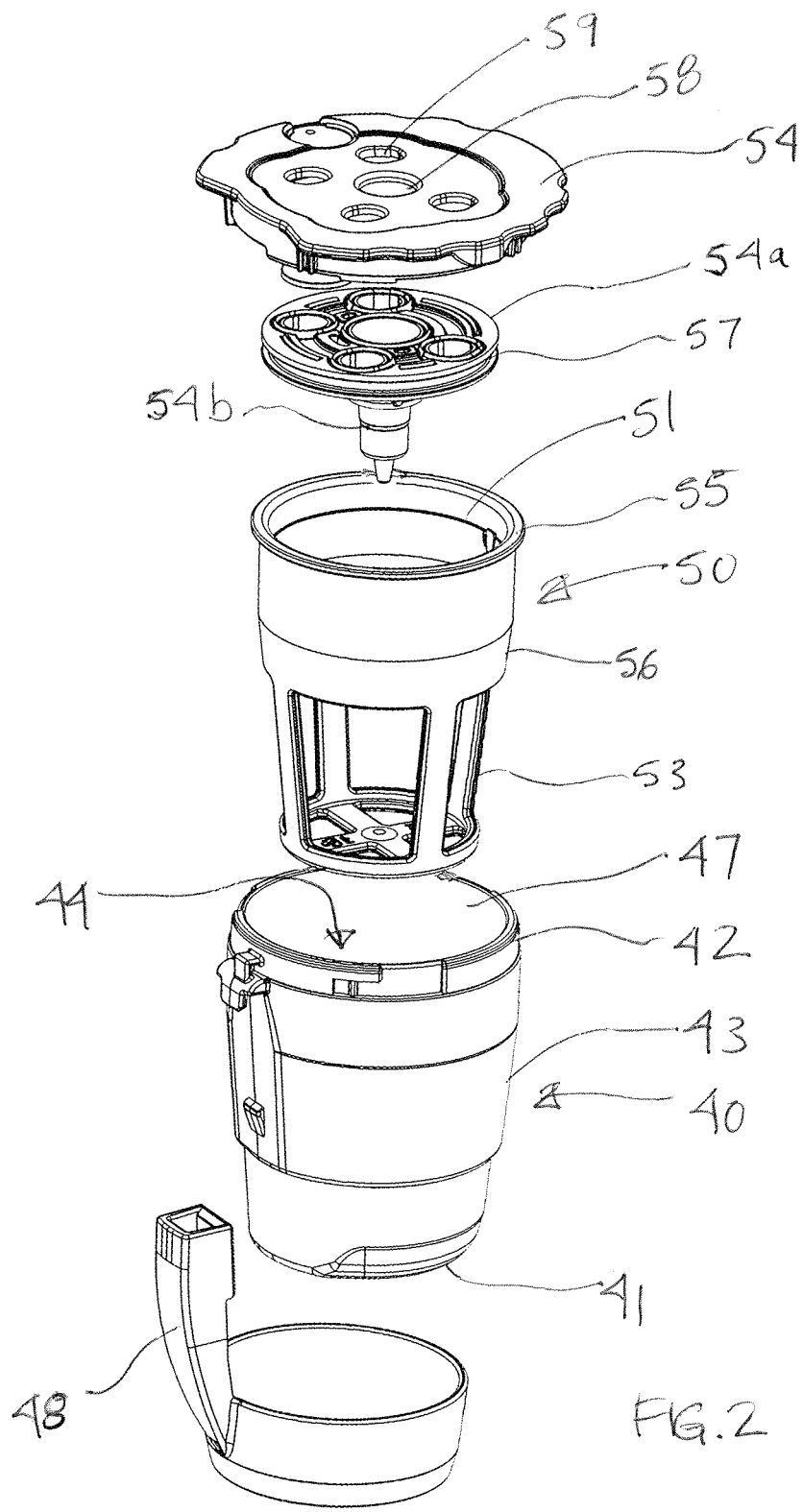
FIG. 2 is an exploded view of the FIG. 1 cartridge.

FIGS. 1 and 2 show a perspective view and an exploded view of a cartridge 4 that incorporates aspects of the invention. In this embodiment, the cartridge includes a body 40 with a cup shape having a bottom 41 at one end, a top 42 at the opposite end, and a sidewall 43 extending between the top 42 and bottom 41. The body 40 defines an interior space 44 that is accessible through an opening 47 at the top 42 of the body 40. The opening 47 can be closed by a cover 54 that engages with the top 42 of the body 40, e.g., to seal the body 40 closed at the top 42. In this embodiment, the cover 54 engages the top 42 by a bayonet-type connection in which lugs on the cover 54 engage with slots on the body 40 by rotating the cover 54 relative to the body 40, but other arrangements are possible such as an interference fit, snap fit, threaded connection, etc. The sidewall 43 has a generally cylindrical shape, but the sidewall 43 could be shaped or otherwise formed in other ways. The body 40 may include a removable spout feature 48 that may help orient the cartridge 4 with respect to a cartridge holder of a beverage machine, e.g., so that inlet openings of the cover 54 are properly aligned to communicate with inlet needles or other ports of the machine. The spout feature 48 may be removed if desired, e.g., for use with cartridge holders not arranged to accept the spout feature 48. The bottom 41 may include an outlet opening 46 to permit beverage to exit the interior space 44 of the cartridge 4. In some cases, the outlet opening 46 or other portions of the bottom 41 may be adapted to receive an outlet needle or other outlet port of a beverage machine, including a piercing element adapted to pierce a single-use cartridge. Thus, beverage may be delivered from the cartridge 4 to an outlet conduit of the beverage machine, if desired.

In this embodiment, the cover 54 includes a plurality of openings to allow liquid to be introduced into the interior space 44 of the cartridge 4, e.g., so the liquid can mix with a beverage material and form a beverage. By having a plurality of openings, the cartridge may be capable of operating with multiple different types of beverage machines, including machines that have multiple inlet needles or other ports that are adapted to pierce a single-use cartridge. Rather than be pierced by the piercing elements of a machine, the cartridge 4 may receive piercing elements into one or more of the openings of the cover 54. In this embodiment, the cover 54 includes a central opening 58 and four peripheral openings 59 positioned around the central opening 58. The peripheral openings 59 may be equally spaced around the central opening 58, e.g., in the form of a quincunx or spots on a five-sided die, or may be less regularly spaced. For example, as shown in FIGS. 1-4, the peripheral openings 59 may be positioned at corners or vertices of an isosceles trapezoid with the central opening 58 located at or near a center of the isosceles trapezoid. Also, while four peripheral openings 59 are shown, other numbers may be used, e.g., 2, 3, 5 or more. Each of the openings 58, 59 may receive a piercing element without damaging the cartridge 4 and/or the piercing element, e.g., so the piercing element may introduce liquid into the cartridge 4. Of course, the openings 58, 59 need not receive a piercing element or other structure to receive liquid into the opening. Instead, a port or other arrangement may introduce liquid into one of the openings 58, 59 without having any portion enter the opening 58, 59.

In this embodiment, the cover 54 includes a lower portion 54a that is attached at a bottom side of the cover 54. The lower portion 54a includes a conduit 54b, which may function to receive liquid from the central opening 58 and/or one or more peripheral openings 59 to distribute the liquid into the interior space 44 of the cartridge 4. For example, in some cases, an inlet port of a beverage machine may introduce water into the central opening 58 along a vertically downward path, and the conduit 54b may receive the water and redirect flow of the water to one or more horizontal directions, one or more vertical downward directions, and/or one or more other directions. This may aid in suitably wetting or otherwise exposing beverage material to the water. Of course, a conduit 54b that functions to distribute liquid is not required and the openings 58, 59 could be arranged to provide an unimpeded path into the interior space 44. In such a case, the cover 54 need not include a lower portion 54a. Also, although the conduit 54b is formed as part of a lower portion 54a of the cover 54, the cover 54 could be made of a single part having the conduit 54b.

As can be seen in FIG. 2, the cartridge 4 may include a filter basket 50 that is received into the interior space 44 of the body 4. In this embodiment, the filter basket 50 has a cup shape with a sidewall 56 having a filter portion 53 through which beverage formed in the filter basket 50 may flow. That is, coffee grounds or other beverage material may be received in the filter basket 50, and beverage formed by mixing the beverage material with liquid may pass through the filter portion 53, e.g., which removes particles over a particular size from the exiting beverage. The filter portion 53 may be formed by a wire or plastic mesh that is joined to the sidewall 56 (e.g., formed as a molded plastic part) of the filter basket 50, or may be formed in other ways, such as by perforating the sidewall 56. (FIG. 2 does not show a filter mesh, but rather openings of the sidewall 56 where a filter portion 53 can be located.) Alternately, the entire filter basket 50 may be made of a wire or plastic mesh material, as the filter basket may be made in any suitable way. In this embodiment, the filter portion 53 is located in a lower portion of the sidewall 56 of the filter basket 50. However, the filter portion 53 may be arranged in other locations, if desired. Also, while the filter portions 53 in this embodiment have approximately rectangular shapes (wrapped around the cylindrical sidewall), other arrangements are possible, such as circular, annular, irregular or other shaped filter portions 53. The filter portion 53 may include sections at a bottom of the filter basket 50 as well.

The top of the filter basket 50 has a top opening 51 through which a beverage material space in the filter basket 50 can be accessed, e.g., to provide beverage material into the filter basket 50. A rim 55 may be arranged around the top opening 51, and may be arranged to engage with the cover 54, e.g., to form a seal so that liquid entering the cartridge 4 via one of the openings 58, 59 passes into the filter basket 50. In this embodiment, the cover 54 carries an o-ring or other gasket 57 that engages with an inner surface of the filter basket 50 near the rim 55 with a friction fit. Alternately, the filter basket 50 may engage the cover 54 with a threaded engagement, bayonet connection or other. By engaging the filter basket 50 with the cover 54, a user can remove the filter basket 50 from the body 40 when the cover 54 is removed from the body 40. In another embodiment, the filter basket 50 may be arranged to engage with a portion of the body 40 rather than engage with the cover 54, e.g., to create a seal that tends to cause liquid to pass into and through the filter basket 50. For example, the rim 55 may rest on a rim of the body 40 that defines the opening 47, acting as a stop with respect to movement of the filter basket 50 into the interior space 44 of the body 40. The cover 54 may engage the top surface of the rim 55 and press the rim 55 into sealing engagement with the body 40 when the cover 54 is tightened. Note, however, that other arrangements are possible, e.g., the rim 55 need not be provided and the filter basket 50 may be provided with a gasket around its upper periphery that engages with an inner side wall at the opening 47. With a rimless filter basket 50, the cover 54 may form a seal with the body 40 directly, and/or the cover 54 may engage with the outside diameter or other portion of the basket 50 to form a suitable seal. In other arrangements, the cartridge 4 need not include the filter basket 50 at all. Instead, beverage material may be provided into the body 40, which may include one or more filter portions as necessary to separate beverage material from beverage that exits the cartridge 4.

In accordance with an aspect of the invention, one or more of the inlet openings in the cover may be arranged to resist flow through the opening in at least one direction, e.g., in a reverse direction from the interior space of the cartridge to outside of the interior space. As described below, this may be done in different ways, and for various purposes. For example, preventing flow in a reverse direction in one more openings may help prevent beverage material and liquid from exiting the cartridge through one of the inlet openings. This may help prevent an inlet port of a beverage machine from being clogged by beverage material that flows from the cartridge and into the inlet port. Although reverse flow in an opening may be resisted, in some cases forward flow into the cartridge may be permitted. This may allow an inlet port to deliver liquid into the cartridge, while being protected from undesired reverse flow from the cartridge into the inlet port. For example, one or more inlet openings may include a one-way valve that allows forward flow into the cartridge through the opening, but resists reverse flow. Thus, if liquid is introduced into the opening in a forward direction, the valve will open so liquid may enter the cartridge. However, if liquid is not introduced into the opening, the valve will remain closed to prevent reverse flow.

Figure 3:
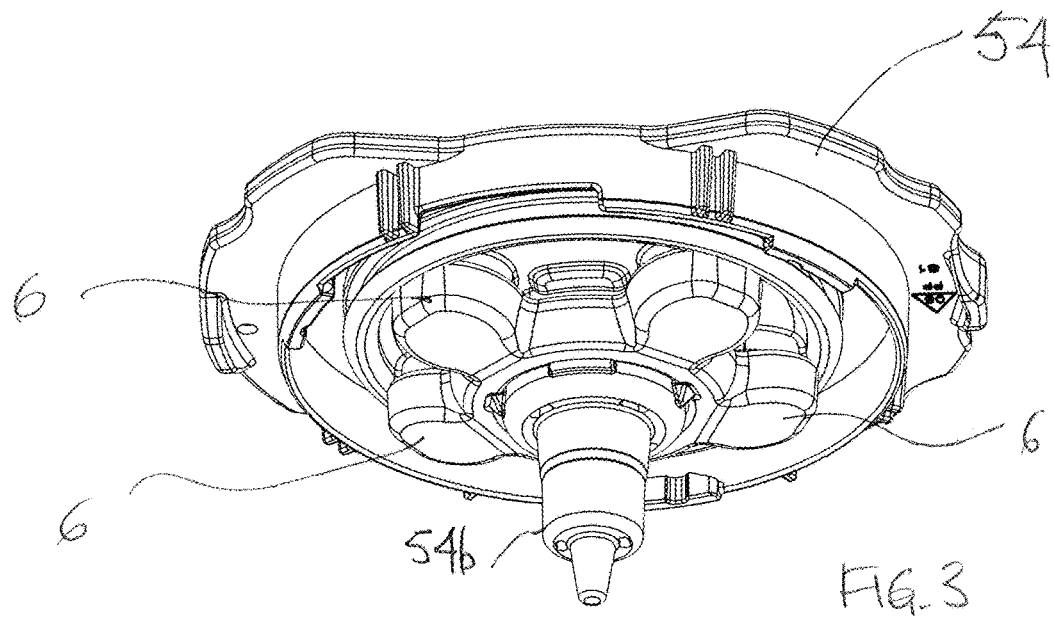
FIG. 3 is a bottom perspective view of a cover for the FIG. 1 embodiment having a flow control element for each peripheral opening.
Figure 4:
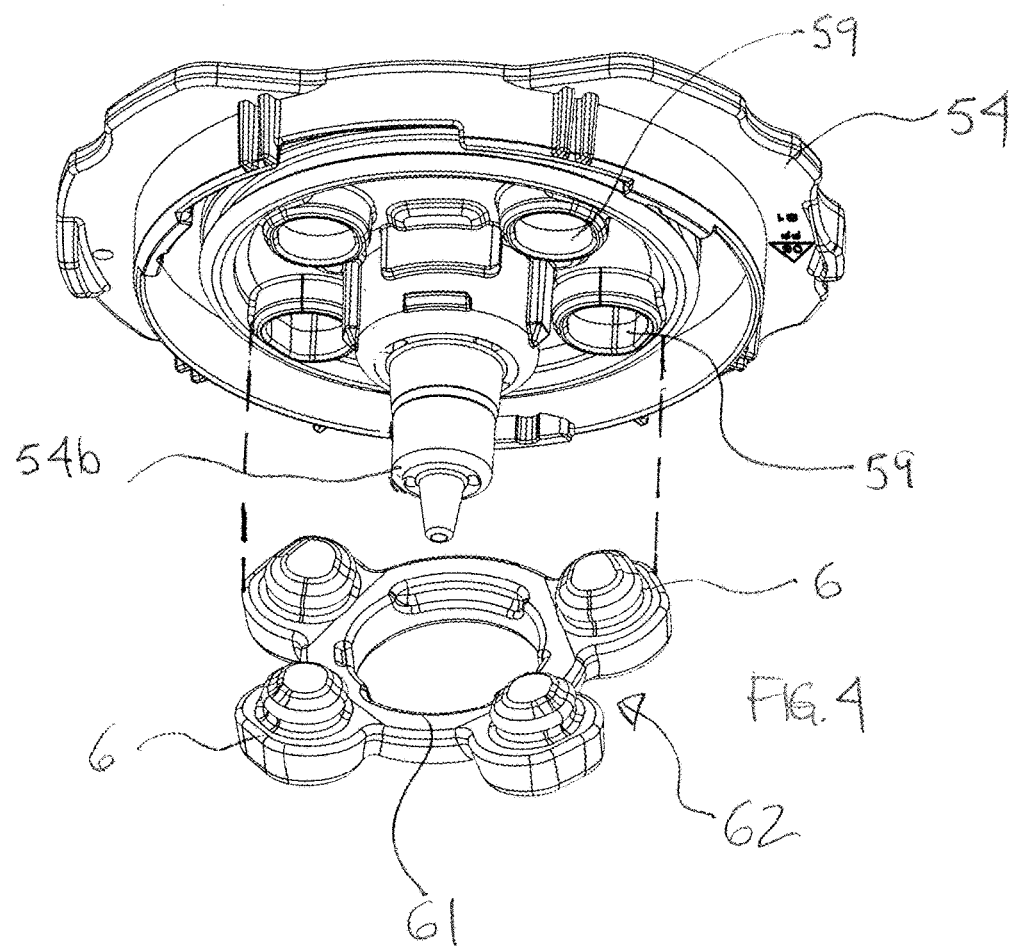
FIG. 4 is an exploded view of the FIG. 3 embodiment.

FIG. 3 shows a bottom perspective view of the cover 54 in an illustrative embodiment in which the peripheral openings 59 each have an element that controls flow through the opening 59. In this embodiment, each peripheral opening 59 has a corresponding plug 6 that engages with the opening 59 to prevent flow through the opening 59. In this embodiment, the plugs 6 are each arranged to engage with the corresponding opening 59 by a friction fit or interference fit, e.g., each plug 6 has a portion forced into the opening 59 from a bottom side of the cover 54. However, in other embodiments, plugs 6 may be arranged to surround or cover an outer part of a corresponding opening 59, e.g., like a snap-on cap on a tube end. FIG. 4 shows an exploded view of the FIG. 3 embodiment, and provides a bottom perspective view of the cover 54 and a top perspective view of the plugs 6. With a plug 6 engaged with a peripheral opening 59, flow through the opening 59 in a reverse direction is prevented, and in fact, fluid pressure inside of the cartridge 4 will tend to hold the plugs 6 in engagement with a corresponding opening 59. Also in this embodiment, the plugs are attached together, e.g., to form a single unitary element. Thus, the plugs 6 can be mounted to the cover 54 by inserting the conduit 54b through a hole 61 in the plug structure 62 so that the plug structure 62 is frictionally or otherwise secured to the cover 54. In this arrangement, the plug structure 62 is formed of a resilient material (such as a silicone rubber) so that the hole 61 can be enlarged to receive the conduit 54b and secure the plug structure 62 by friction fit. Grooves and/or ribs on the plug structure 62 at the hole 61 may engage with corresponding grooves and/or ribs of the cover 54 as shown in FIG. 4. However, the plug structure 62 could be engaged with the cover 54 in other ways, such as by welding, adhesive, fasteners, etc.

Figure 5:
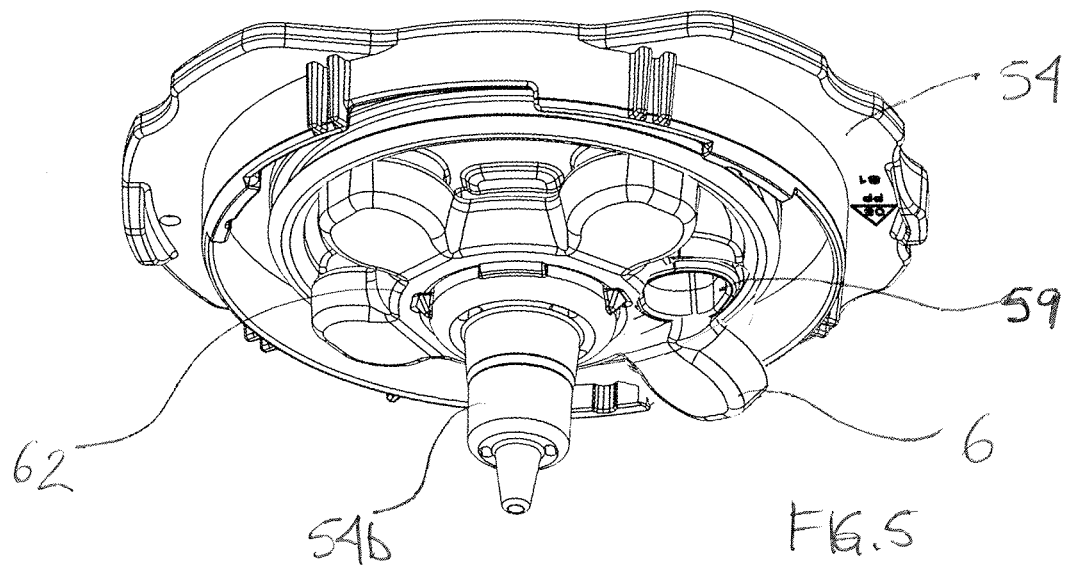
FIG. 5 is a bottom perspective view of the FIG. 1 embodiment with one of the plugs in an open position.

FIG. 3 shows the plugs 6 in a closed position in which flow in at least the reverse direction through the openings 59 is prevented or otherwise resisted. Each of the plugs 6 may be moveable from the closed position to an open position to allow flow in a forward direction and/or a reverse direction through the opening 59. For example, this may be done by removing the plugs 6 and plug structure 62 from the cover 54, e.g., so the cover 54 is arranged like that shown in FIG. 4. In addition, or alternately, the plugs 6 may be movable to the open position while remaining attached to the cover 54 and/or to the other plugs 6. Thus, the plugs 6 may be engaged with the cover 54 such that all (or some) of the plugs remain engaged with the cover 54 when the plugs 6 are disengaged from a respective one of the peripheral openings 59. For example, FIG. 5 shows the FIG. 3 embodiment with one of the plugs 6 disengaged from the corresponding opening 59 so that the opening 59 is exposed, e.g., allowing flow in a reverse direction through the opening 59. The plugs 6 may be moved from the closed to the open position like that in FIG. 5 by pushing on the plug 6 in the reverse direction, e.g., by inserting an element into the peripheral opening 59 from a top side of the cover 54 and pressing downwardly on the plug 6 to move the plug into the interior space 44 of the cartridge 4. This may be done using a tool, such as a pencil or screwdriver, or may be done by inserting an inlet needle or other port of the beverage machine into the opening 59. Thus, the cartridge 4 may be provided into a cartridge holder of the beverage machine, and when the cartridge 4 is enclosed by the machine, e.g., by closing a brew chamber in which the cartridge 4 is held, an inlet needle or other port may be inserted into one or more of the peripheral openings 59 so as to contact and move a corresponding plug 6 from the closed to an open position. This may allow the inlet port to introduce liquid into the cartridge 4 without restriction by the plug 6. Alternately, the plug 6 may be moved to the open position by water or other liquid pressure introduced into the peripheral opening 59, which forces the plug 6 to move out of the opening 59 or otherwise move to the open position. Or, the plug 6 may remain in the closed position even if a piercing element is received into the peripheral opening 59 and/or liquid introduced into the opening 59. In such a case, a user may be required to remove the plug 6 to open the opening 59 to flow. As noted above, the plug 6 may remain attached to the cover 54 even in the open position. Also, the plug 6 may be attached to the cover 54 by a resilient element that tends to bias the plug 6 back toward the closed position. For example, in the FIGS. 3-5 embodiment, the plugs 6 may be attached to the cover 54 by a resilient material that allows the plugs 6 to move between the closed and the open position. The resilient material may be arranged so that once a plug 6 is moved to the open position, the plug 6 is biased by the resilient material toward the closed position. This may allow the plug 6 to cover the opening 59 after a force that moves the plug 6 to the open position is removed. As a result, the plug 6 may operate as a one-way valve in some embodiments.

In some cases, the plugs 6 may be arranged to remain disengaged from the respective peripheral opening 59 once the plug 6 is disengaged from the opening 59, e.g., moved to the open position. For example, as can be seen in FIG. 4, a portion of the plug 6 that is inserted into the opening 59 may be larger than the size of the opening 59 where the plug 6 is engaged. This may prevent the plug 6 from engaging with the opening 59 unless the plug 6 is forced into the opening 59 (which causes the plug 6 and/or a portion of the cover 54 to deform so the plug 6 can be received into the opening 59). Thus, the plugs may be arranged to require the plugs to be forced into the respective peripheral opening 59 to reengage with the peripheral opening 59. This may ensure that once a peripheral opening 59 is opened to forward and/or reverse flow, the opening 59 will remain open to forward and/or reverse flow until a user forces the plug 6 back into engagement and the closed position. In other embodiments, the plug 6 may be biased to move back toward the closed position after being moved to the open position and the moving force is removed. This may cause the plug 6 to cover the opening 59, e.g., to resist reverse flow in the opening 59, but the plug 6 may remain disengaged from the opening 59 until the plug 6 is forced into the opening 59, e.g., by a user's finger or pressure in the cartridge.

Figure 6:
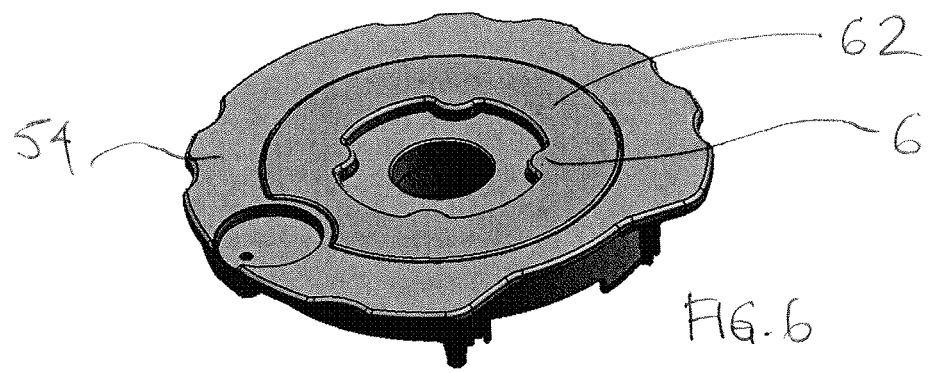
FIG. 6 is a top perspective view of an embodiment in which plugs are engaged with respective openings of the cover from outside the cartridge.
Figure 7:
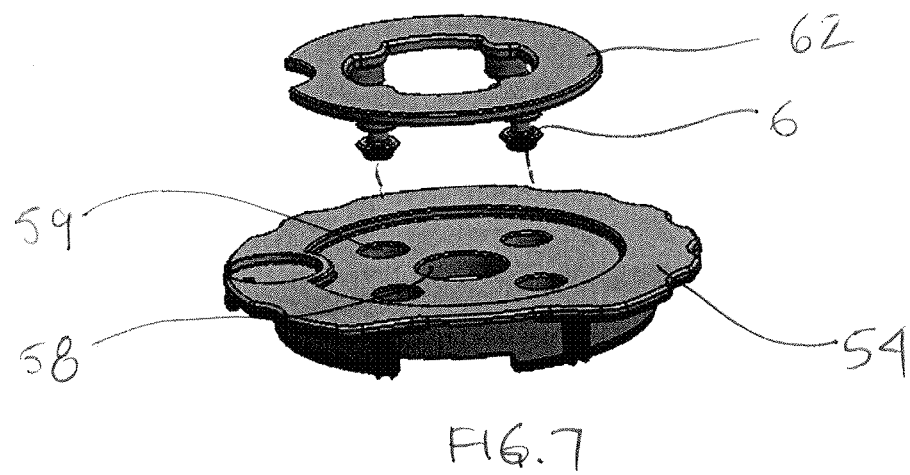
FIG. 7 is an exploded view of the FIG. 6 embodiment.

In the embodiment above, plugs are engaged with a respective opening at a bottom side of the cover, e.g., so that the plugs can be moved to the open position by moving into the interior space of the cartridge. In another embodiment shown in FIGS. 6 and 7, plugs 6 are engaged with a corresponding opening 59 from outside of the cartridge, e.g., by moving the plugs in a forward direction toward the interior of the cartridge 4. As in the FIG. 3 embodiment, the plugs 6 are attached together via a plug structure 62 so that the plugs 6 can be inserted and removed together as a single unit. However, the plugs 6 may be arranged to be individually engaged with a respective opening 59. Note as well that although plugs 6 are provided for all of the peripheral openings 59, only one or fewer than all peripheral openings 59 may have a plug 6. Also, a plug 6 may be provided for the central opening 58 and none of the peripheral openings 59 in some embodiments. This is true not only for the FIGS. 6 and 7 embodiment, but the FIGS. 3-5 embodiment as well, e.g., if the conduit 54*b* is provided with an opening that can engage with a plug.

Figure 8:
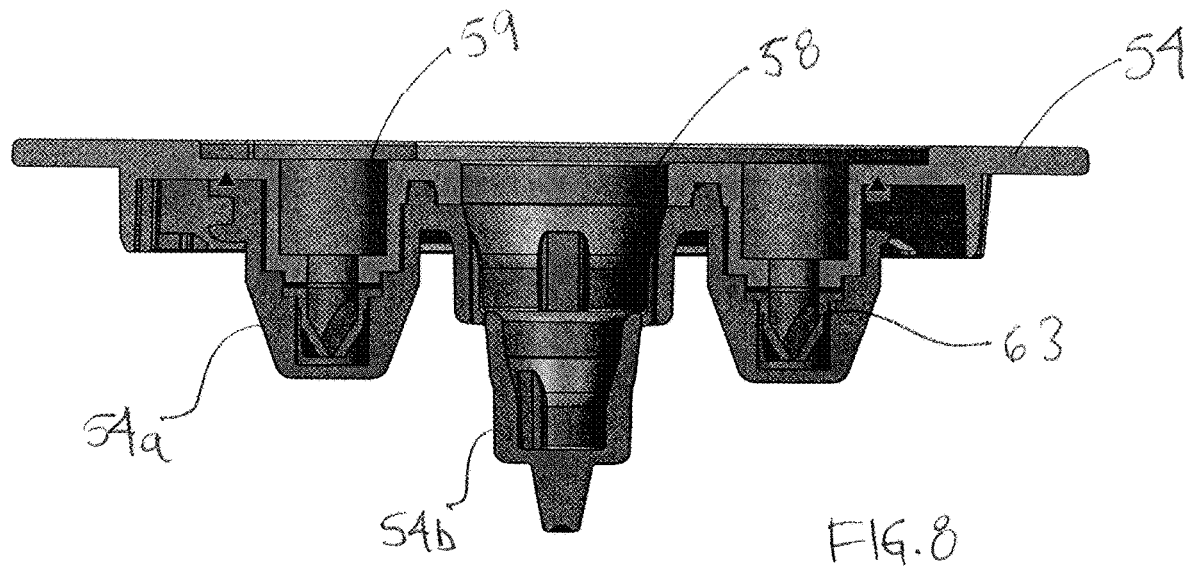
FIG. 8 is a cross sectional view of an embodiment including duckbill valves provided for peripheral openings of a cover.
Figure 9:
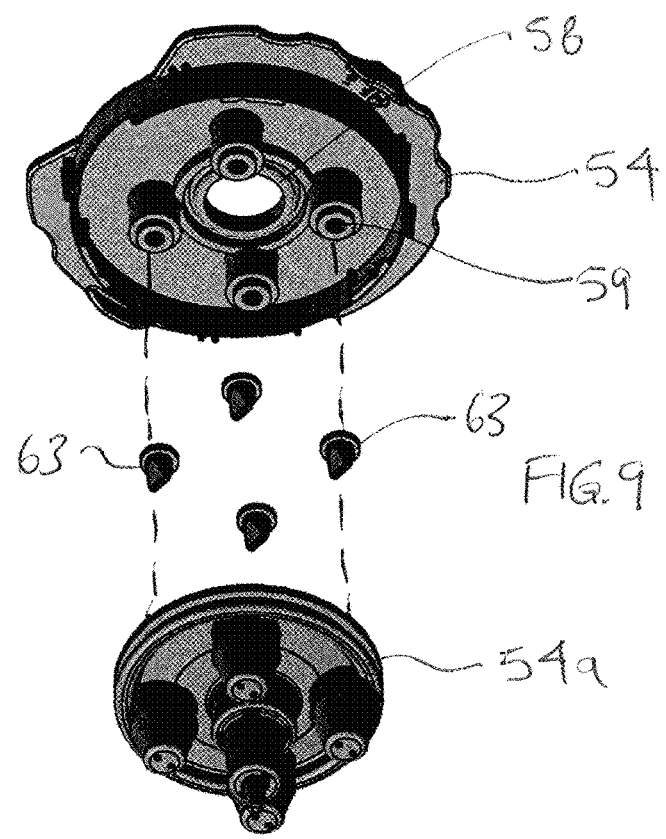
FIG. 9 is an exploded view of the FIG. 8 embodiment.

As described above, some embodiments including a plug engagable with an opening of the cover may be arranged so that the plug operates as a one-way valve for the corresponding opening. FIGS. 8 and 9 show another embodiment in which duckbill valves 63 are provided for each peripheral opening 59. The duckbill valves 63 are one-way valves that operate so as to open to allow forward flow into the interior space 44 of the cartridge 4 (e.g., when exposed to fluid pressure in a top-down direction in FIG. 8 that is higher than a fluid pressure below the duckbill valves 63), but remain closed in the absence of suitable flow into the interior space 44 and/or relatively higher pressure inside the interior space 44. In this embodiment, the duckbill valves 63 are sandwiched between the cover 54 and the lower portion 54*a* of the cover, but the valves 63 could be arranged in other ways. In addition, any suitable type of valve may be employed, such as ball and spring-type check valves, flapper valves, septum valves, etc. In this embodiment, the cover 54 and the peripheral openings 59 are arranged to have an inlet needle or other probe receiving cavity above the valves 63 so that an inlet needle can be received into the opening 59 without contacting the valve 63. This can allow the valves 63 to prevent reverse flow through a corresponding opening 59, even if an inlet needle is positioned in the opening 59. This can help prevent reverse flow into the inlet needle, e.g., if the inlet needle is not used to introduce liquid into the cartridge or if liquid is introduced by the inlet needle at pressures below a pressure in the cartridge interior (at least on a temporary basis). Note that in some embodiments, the valves 63 may be replaced with a piercable membrane that serves to prevent flow through the opening 59, either in forward or reverse directions. The piercable membrane may be pierced by a tool, or by an inlet needle or other inlet probe inserted into the opening 59 to allow flow through the opening 59. Of course, if the membrane is to be pierced by an inlet needle, the membrane would need to be positioned in the opening 59 so that the membrane would be contacted by the piercing element.

Figure 10:
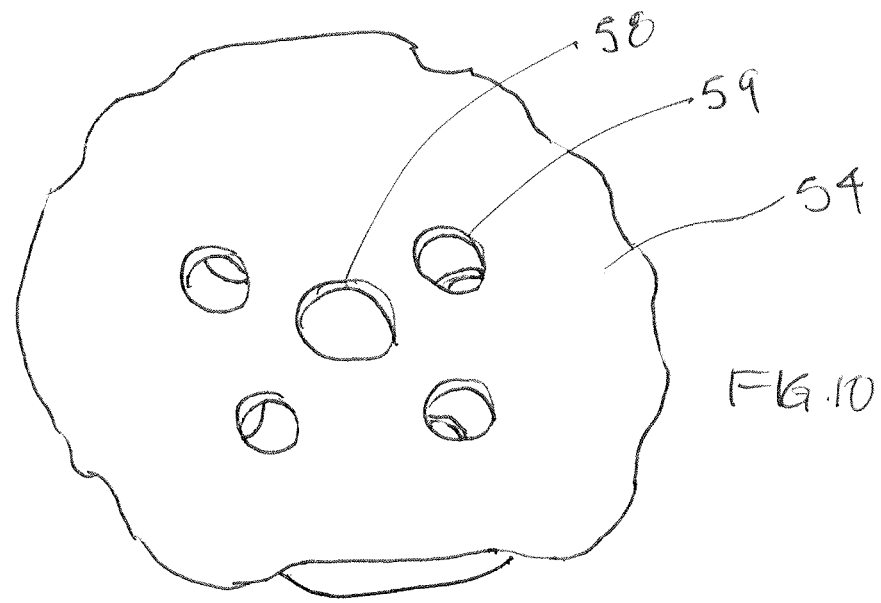
FIG. 10 is a top perspective view of a cover having a rotatable shutter door.
Figure 11:
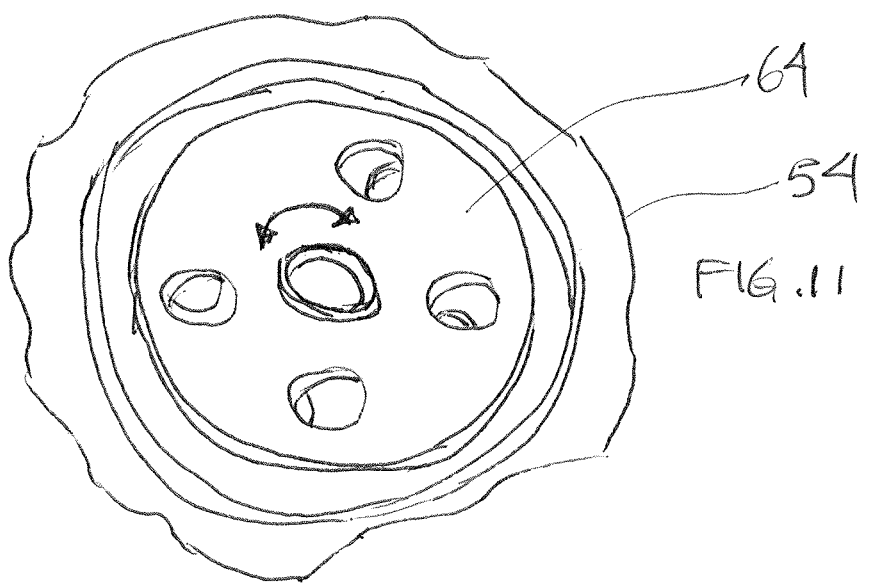
FIG. 11 is a bottom perspective view of the FIG. 10 embodiment.

FIGS. 10 and 11 show another embodiment in which inlet openings of a cartridge include a movable door to open and close the opening to flow. In this embodiment, the cover 54 includes a rotatable shutter door 64 that can be rotated about the central opening 58 so that holes in the door 64 can be aligned with the peripheral openings 59 to allow flow through the openings 59, or so that the door 64 blocks the openings 59 to flow. Although in this embodiment the door 64 is rotatable, the door 64 may be moved in other ways, such as along a linear or other path to open and close the peripheral openings 59. Moreover, the central opening 58 in addition to, or in place of, the peripheral openings 59 may be opened and closed to flow by a door 64.

In accordance with an aspect of the invention, the cartridge may be used with a beverage forming machine to make a beverage. In one particular arrangement, the cartridge may be used with a beverage machine that has inlet and/or outlet needles or other piercing elements. These elements may normally operate to pierce a single-use capsule to form inlet and outlet openings in the capsule, but may be used with a reusable cartridge and extend into inlet and/or outlet openings of the cartridge without damaging the cartridge and while still allowing the machine to form a proper beverage. For example, the cartridge 4 described above may be placed in a cartridge holder of a beverage machine. Thereafter, the cartridge holder may be moved to the closed position so that inlet and/or outlet needles or other piercing elements extend into the openings 58, 59 and/or the beverage outlet 46 of the cartridge 4. As also described above, and depending on the cartridge embodiment, inlet piercing elements may open a corresponding opening 58, 59 to flow, e.g., by moving a plug to disengage from the opening 58, 59, by piercing a membrane, etc. Liquid may be introduced into the cartridge interior space via some or all of the piercing elements, and flow control elements (such as a one-way valve, if present) may operate to allow flow into the cartridge, and/or resist reverse flow from the cartridge through the opening 58, 59.

Figure 12:
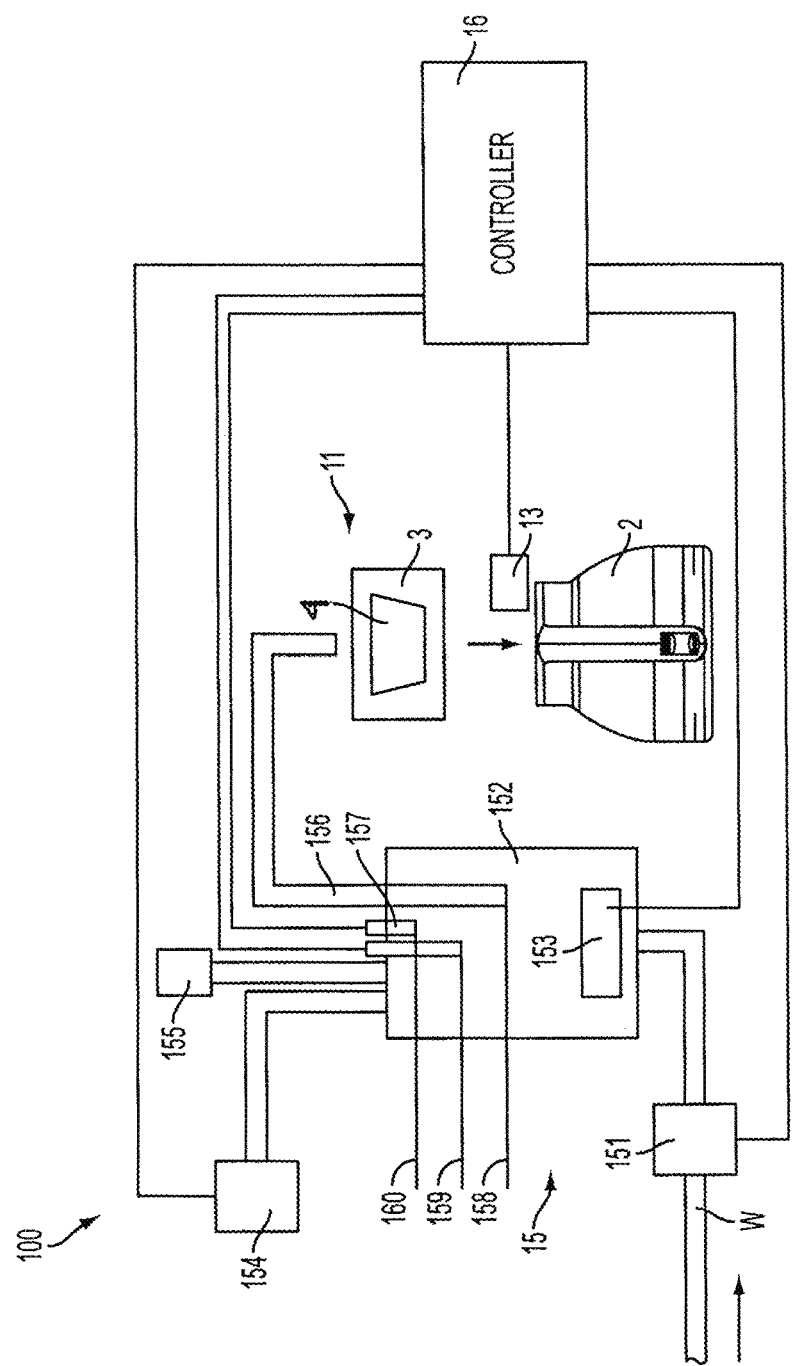
FIG. 12 is a schematic block diagram of various components that may be included in a beverage forming apparatus.

FIG. 12 shows a schematic block diagram of various components that may be included in a beverage forming apparatus 100 in one illustrative embodiment. Those of skill in the art will appreciate that a beverage forming apparatus 100 may be configured in a variety of different ways, and thus aspects of the invention should not be narrowly interpreted as relating only to one type of beverage forming apparatus. In this embodiment, water or other precursor liquid may be provided by a liquid supply 15 to mix with a beverage material at a beverage forming station 11. The beverage material (such as coffee grounds, tea leaves, a powdered drink mix, etc.) may be provided in a cartridge 4, or not, and beverage produced by mixing the liquid with the beverage material may be dispensed into a user's container 2 (cup, carafe, etc.) via a beverage outlet.

The liquid supply 15 in this embodiment controls the volume of liquid provided to the beverage forming station 11 by filling the tank to a liquid dispense level 159, 160 and then pressurizing the tank 152 by way of an air pump 154 so that liquid in the tank 152 is forced out of the conduit 156 to the beverage forming station 11. The volume of liquid delivered to the beverage forming station 11 is equal to the volume in the tank 152 between the liquid delivery level 159, 160 and a post-delivery level 158 at a bottom of the conduit 156 in the tank 152. Since there are two delivery levels 159, 160 in this embodiment, two different volumes can be provided to the beverage forming station 11. However, more than two levels, or a single level, may be used.

In this embodiment, the liquid supply 15 provides liquid to the tank 152 via a valve 151 that is coupled to a source W. The source W may have any suitable arrangement, e.g., may provide liquid from a storage tank, a mains water supply or other source. Thus, in some cases, the liquid provided to the tank 152 may vary in temperature by a wide degree depending on various factors, such as time of year, a temperature of a room in which the machine 10 is located, etc. For example, if the source W is a reservoir that is filled by a user, the temperature of liquid in the reservoir may vary between room temperature (e.g., if liquid sits in the reservoir for an extended time) and a cooler temperature (e.g., if the reservoir has just been filled with water that is dispensed from a tap).

To provide liquid to the tank 152 in this embodiment, the valve 151 is controlled by the control circuit 16 to open and close to provide a desired volume of liquid to the tank 152. For example, if the tank 152 is empty or at the post-dispense level 158, the valve 151 may be opened until a conductive probe or other liquid level sensor 157 provides a signal to the control circuit 16 that indicates when liquid arrives at the dispense level 159, 160. In response to the level sensor 157 detecting liquid at the sensor 157, the control circuit 16 may close the valve 151.

Although in this embodiment the liquid level sensor includes a pair of conductive probes capable of contacting liquid in the tank 152 and providing a signal (e.g., a resistance change) indicative of liquid being present at respective dispense levels 159 or 160 in the tank 152, the liquid level sensor may be arranged in other ways. For example, the sensor may include a microswitch with an attached float that rises with liquid level in the tank 152 to activate the switch. In another embodiment, the liquid level sensor may detect a capacitance change associated with one or more liquid levels in the tank, may use an optical emitter/sensor arrangement (such as an LED and photodiode) to detect a change in liquid level, may use a pressure sensor, may use a floating magnet and Hall effect sensor to detect a level change, and others. Thus, the liquid level sensor is not necessarily limited to a conductive probe configuration. Moreover, the liquid level sensor may include two or more different types sensors to detect different levels in the tank. For example, a pressure sensor may be used to detect liquid at the dispense level 160 (e.g., complete filling of the tank 152 may coincide with a sharp rise in pressure in the tank 152), while a conductive probe may be used to detect liquid at the other dispense level 159.

Further, a liquid level sensor need not be used to fill the tank to the dispense level 159, 160. Instead, other techniques may be used to suitably fill the tank 152, such as opening the valve 151 for a defined period of time that is found to correspond to approximate filling of the tank 152 to the desired level. Of course, other arrangements for providing liquid to the tank 152 are possible, such as by a pump (e.g., a centrifugal pump, piston pump, solenoid pump, diaphragm pump, etc.), gravity feed, or other, and the way by which the tank is filled to the dispense level 159, 160 may depend on the technique used to provide liquid to the tank. For example, control of a volume of liquid provided to fill the tank 152 to the dispense level 159, 160 may be performed by running a pump for a predetermined time, detecting a flow rate or volume of liquid entering the tank 152 (e.g., using a flow meter), operating a pump for a desired number of cycles (such as where the pump is arranged to deliver a known volume of liquid for each cycle), detecting a pressure rise in the tank 152 using a pressure sensor, or using any other viable technique.

Liquid in the tank 152 may be heated by way of a heating element 153 whose operation is controlled by the control circuit 16 using input from a temperature sensor or other suitable input. Of course, heating of the liquid is not necessary, and instead (or additionally) the apparatus 100 may include a chiller to cool the liquid, a carbonator to carbonate the liquid, or otherwise condition the liquid in a way that alters the volume of liquid in the tank 152. (Generally speaking, components of the liquid supply 15 that heat, cool, carbonate or otherwise condition liquid supplied to the beverage forming station 11 are referred to as a "liquid conditioner.")

In this embodiment, liquid may be discharged from the tank 152 by an air pump 154 operating to force air into the tank 152 to pressurize the tank and force liquid to flow in the conduit 156 to the beverage forming station 11. Since the conduit extends downwardly into the tank 152, the volume of liquid delivered to the forming station 11 is defined as the volume in the tank 152 between the dispense level 159, 160 and the bottom end of the conduit 156. Again, liquid may be caused to flow from the tank 152 to the beverage forming station 11 in other ways. For example, a pump may be used to pump liquid from the tank 152 to the forming station 11, liquid may be allowed to flow by gravity from the tank 152, and others. A vent 155, which can be opened or closed to vent the tank 152, may be provided to allow the tank 152 to be filled without causing a substantial rise in pressure in the tank 152 and to allow liquid to be delivered from the tank 152 by pressurizing the tank using the air pump 154. In this embodiment, the vent 155 is actually not controlled by the control circuit 16, but remains always open with an orifice of suitable size to allow venting for filling of the tank 152, and air pressure buildup in the tank 152 to allow liquid delivery. Other flow control features may be provided as well, such as a check valve or other flow controller that can prevent backflow in the conduit between the source W and the tank 152, or between the tank 152 and the beverage forming station 11.

The beverage forming station 11 may use any beverage making ingredient, such as ground coffee, tea, a flavored drink mix, or other beverage medium, e.g., contained in a cartridge 4. Alternately, the beverage forming station 11 may function simply as an outlet for heated, cooled or otherwise conditioned water or other liquid, e.g., where a beverage medium is contained in the container 2. Once liquid delivery from the tank 156 to the station 11 is complete, the air pump 154 (or other air pump) may be operated to force air into the conduit 156 to purge liquid from the beverage forming station 11, at least to some extent.

Operation of the valve 151, air pump 154 and other components of the apparatus 100 may be controlled by the control circuit 16, e.g., which may include a programmed processor and/or other data processing device along with suitable software or other operating instructions, one or more memories (including non-transient storage media that may store software and/or other operating instructions), temperature and liquid level sensors, pressure sensors, input/output interfaces, communication buses or other links, a display, switches, relays, triacs, or other components necessary to perform desired input/output or other functions.

The cartridge 4 in this example may be used in a beverage machine to form any suitable beverage such as tea, coffee, other infusion-type beverages, beverages formed from a liquid or powdered concentrate, etc. Thus, the cartridge 4 may contain any suitable beverage medium, e.g., ground coffee, tea leaves, dry herbal tea, powdered beverage concentrate, dried fruit extract or powder, powdered or liquid concentrated bouillon or other soup, powdered or liquid medicinal materials (such as powdered vitamins, drugs or other pharmaceuticals, nutriaceuticals, etc.), and/or other beverage-making material (such as powdered milk or other creamers, sweeteners, thickeners, flavorings, and so on). In one illustrative embodiment, the cartridge 4 contains a beverage medium that is configured for use with a machine that forms coffee and/or tea beverages, however, aspects of the invention are not limited in this respect.

As used herein, "beverage" refers to a liquid substance intended for drinking that is formed when a liquid interacts with a beverage medium. Thus, beverage refers to a liquid that is ready for consumption, e.g., is dispensed into a cup and ready for drinking, as well as a liquid that will undergo other processes or treatments, such as filtering or the addition of flavorings, creamer, sweeteners, another beverage, etc., before being consumed.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A reusable beverage cartridge for use in a beverage forming machine, comprising:
   a cartridge body having a bottom, a top, and a sidewall extending between the bottom and the top, the body having an opening at the top to an interior space and an outlet to allow beverage to exit the interior space; and
   a cover arranged to removably engage with the top of the cartridge body at the opening to close the opening of the body, the cover having a central opening to permit entry of liquid into the interior space and a plurality of peripheral openings through the cover positioned around the central opening, each of the plurality of peripheral openings being closed to flow in a reverse direction from the interior space to outside of the interior space when engaged with an associated plug included among a plurality of plugs, and the central opening being open to flow in the reverse direction from the interior space;
   wherein each of the plurality of plugs is arranged to remain attached to the cover when disengaged from a respective one of the plurality of peripheral openings.

2. The cartridge of claim 1, wherein the plurality of peripheral openings are selectively closed to flow when engaged with an associated plug included among the plurality of plugs such that each of the plurality of peripheral openings is openable to flow in the reverse direction from the interior space, and closeable to flow in the reverse direction from the interior space.

3. The cartridge of claim 1, wherein the plurality of plugs are attached together.

4. The cartridge of claim 1, wherein each of the plurality of plugs is movable to an open position by moving the plug in a direction opposite to the reverse direction.

5. The cartridge of claim 1, wherein each of the plurality of plugs is configured to remain disengaged from the respective one of the plurality of peripheral openings once the plug is disengaged, and is configured to require the plug to be forced into the respective one of the plurality of peripheral openings to reengage with the respective one of the plurality of peripheral openings.

6. The cartridge of claim 1, wherein each of the plurality of plugs is configured to be pushed into the interior space to open the respective one of the peripheral openings to flow.

7. The cartridge of claim 6, wherein each of the plurality of plugs is configured to remain attached to the cover after being pushed into the interior space.

8. The cartridge of claim 1, further comprising a filter basket defining a beverage material space in which to hold a beverage material used to form a beverage, the filter basket having a top opening through which the beverage material space is accessible, an inlet to receive liquid into the beverage material space, and a filter portion to allow flow of beverage out of the beverage material space, the filter basket being receivable into the interior space of the cartridge body through the opening of the cartridge body.

9. The cartridge of claim 8, wherein the cover seals the top opening of the filter basket when the cover is closed and engaged with the cartridge body opening.

10. A reusable beverage cartridge for use in a beverage forming machine, comprising:
    a cartridge body having a bottom, a top, and a sidewall extending between the bottom and the top, the body having an opening at the top to an interior space and an outlet to allow beverage to exit the interior space; and
    a cover arranged to removably engage with the top of the cartridge body at the opening to close the opening of the body, the cover having a central opening and a plurality of peripheral openings positioned around the central opening to permit entry of liquid into the interior space, each of the plurality of peripheral openings being configured so that it is closed to flow when engaged by one of a plurality of plugs;
    wherein each of the plurality of plugs is movable into the interior space to disengage from a respective one of said plurality of peripheral openings;
    wherein each of the plurality of plugs is configured to remain attached to the cover after disengagement from the respective one of said peripheral openings.

11. The cartridge of claim 10, wherein the plurality of plugs are attached together.

12. The cartridge of claim 11, wherein the cover includes a conduit arranged to distribute liquid introduced into the central opening, and wherein the plurality of plugs are attached to the conduit.

13. The cartridge of claim 10, wherein each of the plurality of plugs is configured to be moved into the interior space by a cartridge piercing element moved into the respective one of the peripheral openings.

14. The cartridge of claim 10, wherein each of the plurality of plugs is arranged to remain disengaged from a corresponding peripheral opening once the plug is disengaged, and is arranged to require the plug to be forced into the corresponding peripheral opening to reengage with the peripheral opening.

15. The cartridge of claim 10, further comprising a filter basket defining a beverage material space in which to hold a beverage material used to form a beverage, the filter basket having a top opening through which the beverage material space is accessible, an inlet to receive liquid into the beverage material space, and a filter portion to allow flow of beverage out of the beverage material space, the filter basket being receivable into the interior space of the cartridge body through the opening of the cartridge body.

16. The cartridge of claim 15, wherein the cover seals the top opening of the filter basket when the cover is closed and engaged with the cartridge body opening.

* * * * *